UNITED STATES PATENT OFFICE.

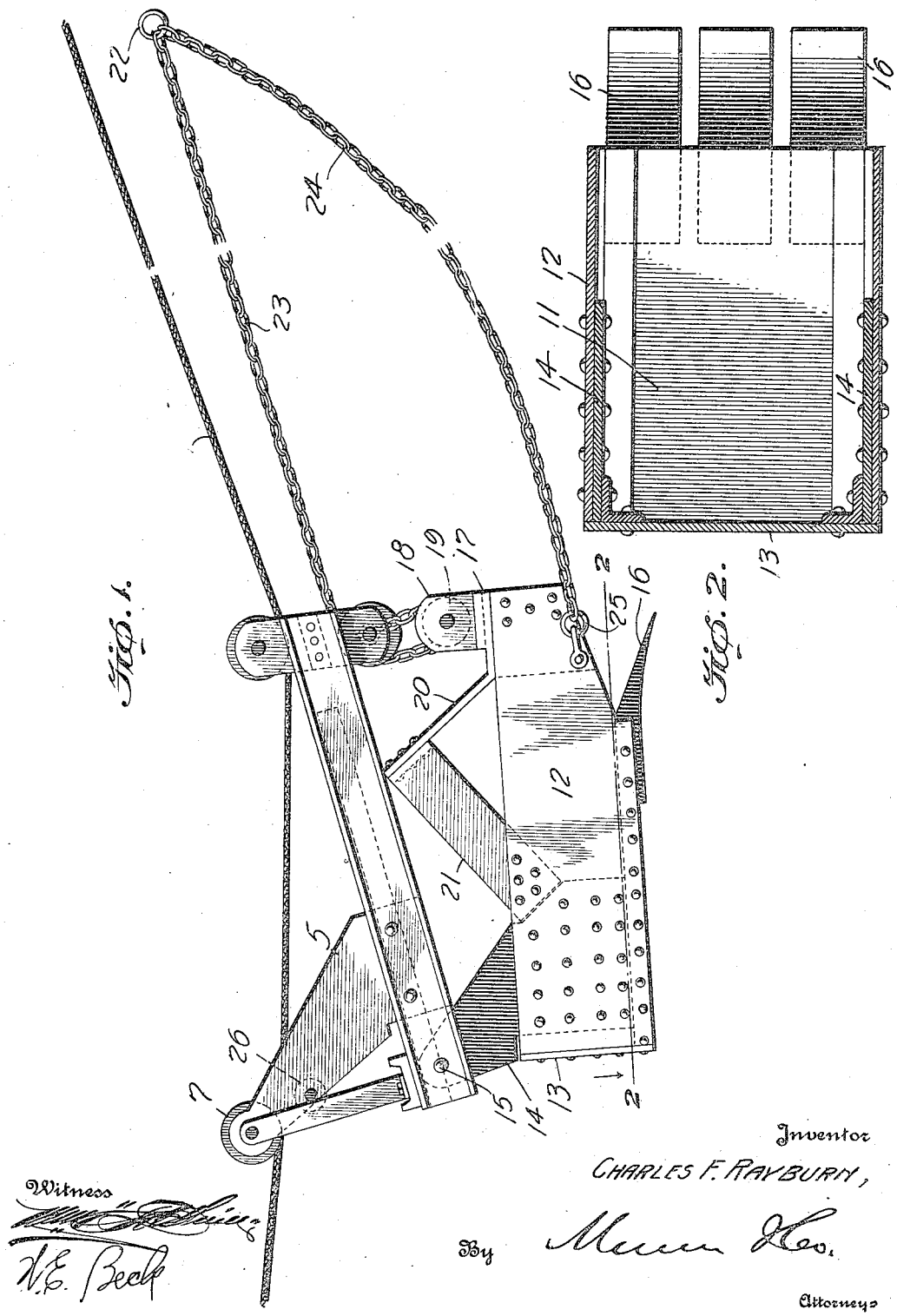

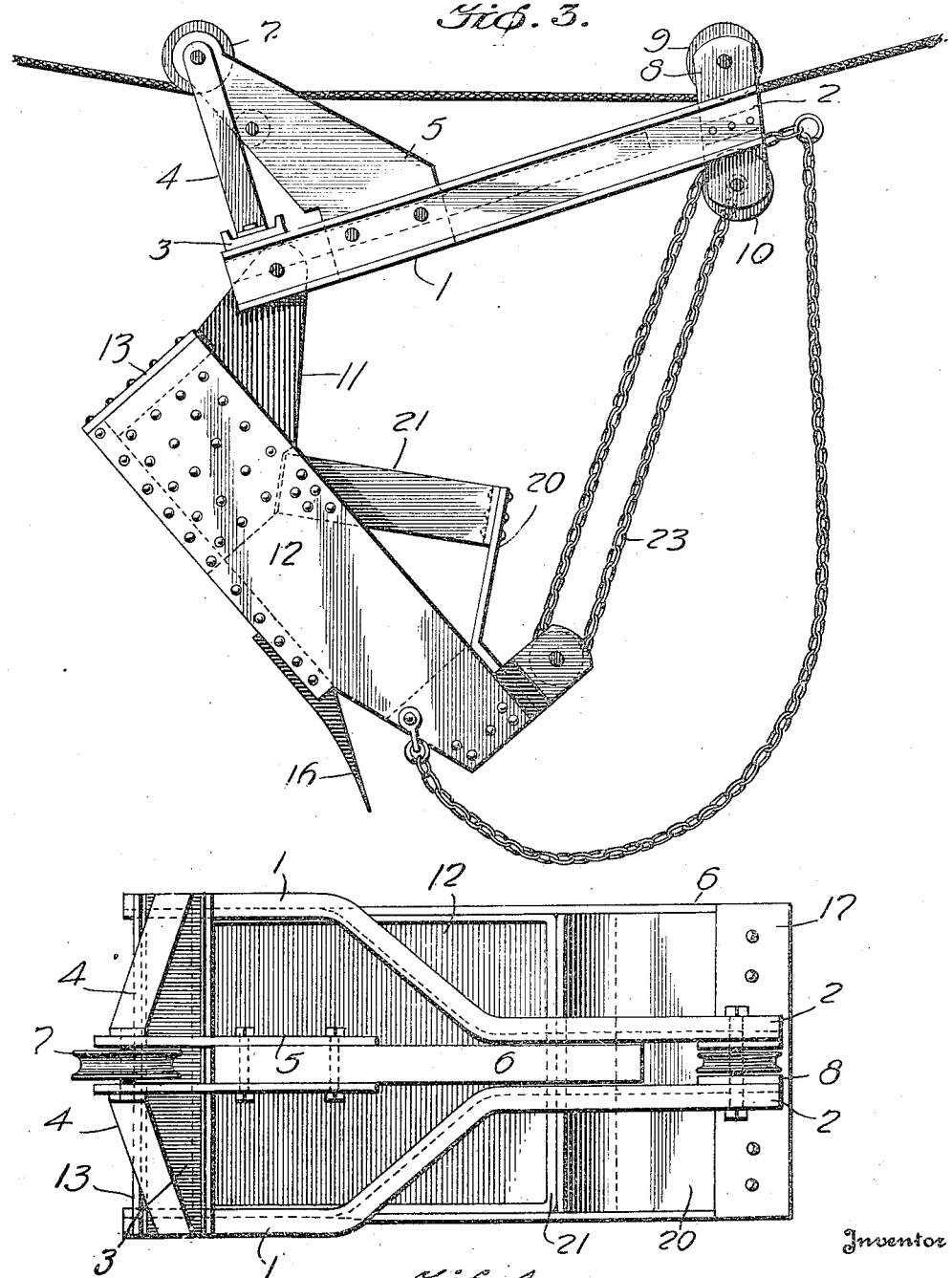

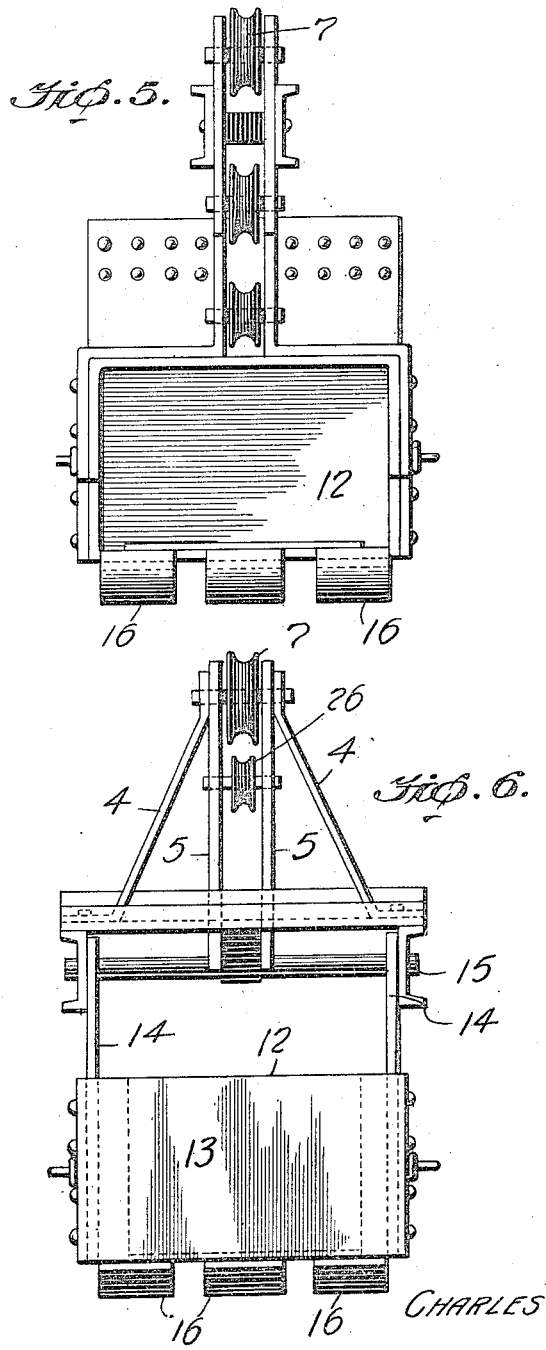

CHARLES FRANK RAYBURN, OF MOSCOW, IDAHO.

EXCAVATING-MACHINE.

1,252,175.  Specification of Letters Patent.  Patented Jan. 1, 1918.

Application filed June 18, 1917. Serial No. 175,347.

*To all whom it may concern:*

Be it known that I, CHARLES FRANK RAYBURN, a citizen of the United States, and a resident of Moscow, in the county of Latah and State of Idaho, have invented certain new and useful Improvements in Excavating-Machines, of which the following is a specification.

My invention is an improvement in excavating machinery of that type in which the digging and transporting mechanism is operated from a distance by means of a drag line and is suspended during its journeyings, and has for its object to provide mechanism of the character specified wherein the digging and the dumping are accomplished without the use of tripping mechanism or the like.

In the drawings:

Figure 1 is a side view of the improved mechanism during transportation;

Fig. 2 is a section on the line 2—2 of Fig. 1, looking in the direction of the arrow adjacent the line;

Fig. 3 is a view similar to Fig. 1, with the parts in dumping position;

Fig. 4 is a top plan view;

Fig. 5 is a front view;

Fig. 6 is a rear view.

In the present embodiment of the invention, the excavator is supported by a slack cable $1^a$, the said cable being anchored at one end and being connected to the rear drum of a hoisting engine at the other. A carriage is mounted to run upon the cable, and a scoop or bucket is connected with the carriage. The carriage comprises a pair of spaced side bars 1, of channel material, which are offset inwardly at their front ends, as indicated at 2, and the said bars are connected at their rear ends by a cross bar 3.

A pair of upwardly and inwardly extending brackets 4 is connected with the cross bar 3 at the ends thereof, and plates 5 are connected to the inner faces of the brackets at their top, the said plates extending forwardly and downwardly to a connection with a longitudinal tie bar 6 arranged between the side bars, and extending at its forward end between the inwardly offset ends 2 of the side bars, to which the said tie bar is connected.

A pulley 7 is journaled between the plates 5 and the braces 4, and cross plates 8 are secured to the inner faces of the portions 2 of the side bars at their front ends, the said plates 8 extending above and below the bars 1. Pulleys 9 and 10 are journaled between the ends of the plates, above and below the bars 1 and 2, respectively, and the pulleys 7 and 9 run upon the cable $1^a$ to support the carriage.

The bucket or scoop comprises a bottom 11, side walls 12 and a rear wall 13, and pivot plates 14 are riveted to the side walls near the rear wall, and the said plates extend upwardly and are pivotally connected to the side bars of the carriage, as indicated at 15. Spades 16 are secured to the front end of the bottom, and it will be noticed that the side walls 12 extend well beyond the bottom at the front, and well beyond the spades. The side walls are connected at their front ends by a cross plate 17, and this plate has at its center upstanding lugs 18, between which is journaled a pulley 19. The plate 17 has an inclined extension 20 at its rear edge, the said extension extending at an oblique angle to the plate, and the extension is braced and connected to the side walls intermediate their ends by a substantially U-shaped member 21. The body of the said member is connected to the extension at its top, and the arms of the U-shaped member are connected to the side wall of the scoop or bucket. The provision of the shield plate 20 prevents the choking of the pulley at the front of the bucket by accretions of mud and the like. When the bucket is loaded and in the position of Fig. 3 it will be obvious that mud and the like may fall forward into the pulley, and this mud is carried up by the chain to the pulley 10. The provision of the shield plate 20 permits the scraping of a larger load and without any danger of blockading the action of the device.

A drag line or hauling cable is connected with a ring 22, and from this ring extends a chain 23, which passes over the pulley 10 and downwardly beneath the pulley 19, and upwardly to a connection with the carriage at the pulley 10. Bridle chains 24 extend from the ring to opposite sides of the scoop or bucket, the said bridle chains being connected to the side walls of the scoop or bucket, as indicated at 25.

A pulley 26 is journaled between the plates 5 below the cable $1^a$, for engaging the under side of the said cable during the transportation of the scoop or bucket.

In operation, the drag line connected to the ring 22 winds upon the front drum of the hoisting engine, while the adjacent end of the line 1ᵃ winds upon the rear drum. In order to operate the device, the engineer starts his engine, throws in the clutch of the front drum, pulling the drag line taut and the bucket forward. At this moment all the strain falls on the bridle chains 24, and the bucket is filled, the line 1ᵃ being slack at this time in order that the bucket may enter the pit. With the bucket full, the cable 1ᵃ is tautened by throwing in the clutch on the rear frame, and with the tautening of the cable the dumping apparatus is lifted. The drag line is still taut, and the strain is on the line or chain 23. When dumping position is reached, the engineer slackens the drag line, and the parts immediately take the position of Fig. 3.

Thus the drag line serves three purposes, as a loading line, as a pulling line and as a dumping line. Dumping is accomplished at a high rate of speed, since it is not necessary to slow up to hit a tripping device, nor is there any strain on the bucket, since no tripping device is to be stretched. Dumping is accomplished at any time and at any place, merely by relaxing the tension on the drag line. The digging apparatus returns to digging position by gravity.

With the improved bucket, the operation of loading and dumping is greatly facilitated, since the speed may be constant and at the highest possible rate at all times.

I claim:

1. In an excavating machine, the combination of a transporting cableway, suitable support for said cableway, a traveling platform suspended from said cableway and having connection therewith by means of grooved wheels for traveling thereon, a digging member hinged at its rear end to the rear end of said platform and suspended therefrom, a grooved wheel journaled between brackets mounted upon the forward end of said digging member and secured thereto, a grooved wheel journaled between brackets secured to said platform and extending below the forward end thereof, a hauling cable secured to the forward end of said platform and in engagement with said grooved wheels for suspending the forward end of said digging member from said platform and drawing them near together, and for hauling them along said cableway, substantially as shown and described, and a shield arranged in rear of the grooved wheel at the forward end of the digging member for preventing mud and the like from falling upon the said pulley.

2. In an excavating machine with a cable supported traveling platform, a rectangular excavating bucket depending from the rear end of said platform and hinged thereto, a stirrup shaped piece secured to the upper part of the rear portion of said bucket and extending across the top thereof, a shield piece secured to the upper front portion of said bucket and extending across the top thereof, a cross piece secured to the upper front corners of said bucket and extending across the top thereof, secured to the central portion of said cross piece, a pair of brackets having a grooved wheel journaled between their upper ends, cable connection between said wheel and a similar wheel depending from said traveling platform, and a bridle having its ends secured to the front end of said bucket and its center in articulation with said cable connection.

CHAS. FRANK RAYBURN.

Witnesses:
J. S. BUCHANAN,
ELSIE RYAN.

Copies of this patent may be obtained for five cents each, by addressing the "Commissioner of Patents, Washington, D. C."